US012609827B2

(12) United States Patent
Grover et al.

(10) Patent No.: US 12,609,827 B2
(45) Date of Patent: Apr. 21, 2026

(54) AUTHENTICATION BASED ON TRANSACTIONS STORED IN BLOCKCHAIN

(71) Applicant: MICRO FOCUS LLC, Santa Clara, CA (US)

(72) Inventors: Douglas Max Grover, Provo, UT (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 926 days.

(21) Appl. No.: 17/466,521

(22) Filed: Sep. 3, 2021

(65) Prior Publication Data

US 2023/0072866 A1     Mar. 9, 2023

(51) Int. Cl.
| | |
|---|---|
| *G06F 7/04* | (2006.01) |
| *H04L 9/32* | (2006.01) |
| *H04L 9/40* | (2022.01) |
| *H04L 9/00* | (2022.01) |

(52) U.S. Cl.
CPC .......... *H04L 9/3236* (2013.01); *H04L 63/083* (2013.01); *H04L 9/50* (2022.05)

(58) Field of Classification Search
CPC ....... H04L 9/50; H04L 9/3236; H04L 9/3242; H04L 63/083; H04L 63/061; H04L 9/0866; G06F 21/31; G06F 21/335
See application file for complete search history.

(56) References Cited

U.S. PATENT DOCUMENTS

| | | | |
|---|---|---|---|
| 9,230,084 | B2 | 1/2016 | Robertson |
| 10,007,913 | B2 | 6/2018 | Ebrahimi |
| 10,594,498 | B2 | 3/2020 | Uhr et al. |
| 10,614,461 | B2 | 4/2020 | Castinado et al. |
| 10,848,319 | B2 | 11/2020 | Uhr et al. |
| 11,012,233 | B1 | 5/2021 | Uhr et al. |
| 2014/0365780 | A1 | 12/2014 | Movassaghi |
| 2017/0330179 | A1 | 11/2017 | Song et al. |
| 2017/0344988 | A1 | 11/2017 | Cusden et al. |
| 2018/0097840 | A1* | 4/2018 | Murthy .................. H04L 63/02 |
| 2018/0144114 | A1 | 5/2018 | Fiske |

(Continued)

FOREIGN PATENT DOCUMENTS

| | | |
|---|---|---|
| CN | 112507296 A | 3/2021 |
| WO | WO-2020214968 A1 | 10/2020 |

OTHER PUBLICATIONS

Ahmed et al, Preservation Authentication and Authorization on Blockchain, Aug. 28, 2019, IEEE, pp. 83-88. (Year: 2019).*

(Continued)

*Primary Examiner* — Philip J Chea
*Assistant Examiner* — Jenise E Jackson
(74) *Attorney, Agent, or Firm* — Sheridan Ross P.C.

(57) ABSTRACT

A dynamic transaction associated with a user is identified. For example, the user logging into a server is identified as a dynamic transaction. The dynamic transaction associated with the user is stored in a record (e.g., stored as a block in a blockchain). A first hash from a user device associated with the user is received. The second hash is generated based on the dynamic transaction. A second hash is generated based on the record. The first hash is compared to the second hash. In response to the first hash matching the second hash, the user is authenticated by providing access to a computer resource. For example, the user may be granted access to a database.

20 Claims, 12 Drawing Sheets

(56)  References Cited

U.S. PATENT DOCUMENTS

| | | | | |
|---|---|---|---|---|
| 2019/0050862 | A1* | 2/2019 | Oka | G06Q 20/00 |
| 2019/0163896 | A1* | 5/2019 | Balaraman | G06F 21/41 |
| 2019/0268159 | A1* | 8/2019 | High | H04L 9/3231 |
| 2019/0378127 | A1* | 12/2019 | Dudar | H04L 9/0637 |
| 2020/0119936 | A1* | 4/2020 | Balasaygun | H04L 12/1831 |
| 2020/0120084 | A1* | 4/2020 | Cheng | G06F 21/31 |
| 2020/0134143 | A1* | 4/2020 | Deole | G06F 21/64 |
| 2020/0169408 | A1* | 5/2020 | Herrin | G06Q 40/02 |
| 2020/0252202 | A1* | 8/2020 | Madl | H04L 63/12 |
| 2020/0259633 | A1* | 8/2020 | Gallagher-Lynch | H04L 9/3297 |
| 2020/0344234 | A1* | 10/2020 | Haque | H04L 63/20 |
| 2021/0105148 | A1* | 4/2021 | Greven | H04L 9/0643 |
| 2021/0152537 | A1* | 5/2021 | Bengani | H04L 63/123 |
| 2021/0357870 | A1* | 11/2021 | Joao | G06Q 10/1093 |
| 2022/0012327 | A1* | 1/2022 | McLean | G06F 21/36 |
| 2022/0255750 | A1* | 8/2022 | Amoutzias | H04L 51/212 |
| 2023/0063043 | A1* | 3/2023 | Grover | G06F 21/64 |

OTHER PUBLICATIONS

Murthy et al, Blockchain Based Cloud Computing: Architecture and Research Challenges, Nov. 9, 2020, IEEE, pp. 1-16 (Year: 2020).*
U.S. Appl. No. 17/318,484, filed May 12, 2021, Vamsi Krishna.
U.S. Appl. No. 17/376,999, filed Jul. 15, 2021, Vamsi Krishna.

\* cited by examiner

AUTHENTICATION BASED ON TRANSACTIONS STORED IN BLOCKCHAIN

FIELD

The disclosure relates generally to authentication methods and particularly to authentication based on dynamic transactions in a communication session.

BACKGROUND

Secure access of devices/information has always been a problem. This is especially true today, where remote users are now very common. There are a variety of ways that access to devices/information can be compromised, such as, a username/password being hacked. Once the username/password has been compromised, the user's information/corporate information may be compromised. For more secure access, other levels of authentication may be used. However, many of these types of authentication may require additional hardware (e.g., for biometrics) or processes that make the login process more difficult for the user (e.g., captchas, or addition security questions). Another problem with these types of processes is that the information is typically static/semi-static, which means that it is easier to compromise.

Another problem is where a legitimate user accesses a network (e.g., a corporate network) with a non-approved device. For example, a user may use their home computer (which is not secure, e.g., missing or misconfigured security configuration settings, does not have proper virus scanning/security applications) to access a corporate network. This type of access can pose a security risk for the corporate environment even though the user is a legitimate user.

SUMMARY

These and other needs are addressed by the various embodiments and configurations of the present disclosure. A dynamic transaction associated with a user is identified. For example, the user logging into a server is identified as a dynamic transaction. The dynamic transaction associated with the user is stored in a record (e.g., stored as a block in a blockchain). A first hash from a user device associated with the user is received. The second hash is generated based on the dynamic transaction. A second hash is generated based on the record. The first hash is compared to the second hash. In response to the first hash matching the second hash, the user is authenticated by providing access to a computer resource. For example, the user may be granted access to a database.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, material s, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extrallonce field, which is stored as the left most leaf node in the merkle tree. The counter parameter is often small at 32-bits so each time it wraps the extrallonce field must be incremented (or otherwise changed) to avoid repeating work. When validating or verifying a block, the hashcash algorithm repeatedly hashes the block header while incrementing the counter & extrallonce fields. Incrementing the extrallonce field entails recomputing the merkle tree, as the transaction or other information is the left most leaf node. The body of the block contains the transactions or other information. These are hashed only indirectly through the Merkle root.

As described herein an in the claims, the term "hash" may comprise any process that can detect changes to information. For example, a hashing function may detect changes to computer records, data stored in a database, data stored in a blockchain, data pointed to by the blockchain, changes to files, changes to text, changes to computer programs, and/or the like. A hash may be generated by any known hashing algorithms, such as, Secure Hashing Algorithm (SHA)-2, SHA-256, SHA-512, Message Digest (MD) 5 and/or the like. In addition a "hash" may comprise non-cryptography hash functions, checksums, Cyclic Redundancy Checks (CRC), universal hash functions, cryptographic hash functions, unkeyed cryptographic hash functions, parity checks, a Hashed Based Authentication Code (HMAC) of the data, and/or the like. The hash may include or may not include the genesis block of a blockchain.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
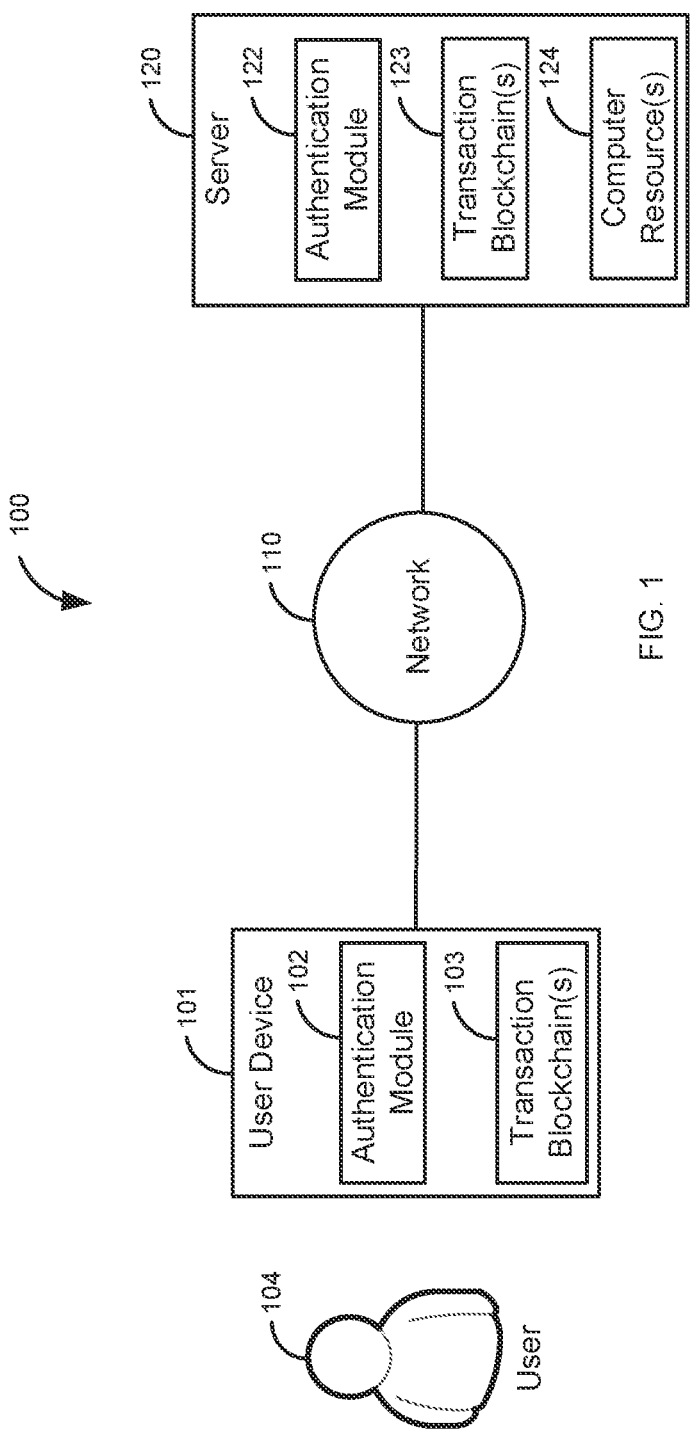
FIG. 1 is a block diagram of a first illustrative system for authenticating a user based on dynamic user transactions.

FIG. 1 is a block diagram of a first illustrative system 100 for authenticating a user 104 based on dynamic transactions. The first illustrative system 100 comprises a user device 101, a network 110, and a server 120. In addition, a user 104 of the user device 101 is also shown for illustrative purposes.

The user device 101 can be or may include any user device 101 that can communicate on the network 110, such as a Personal Computer (PC), a telephone, a video system, a cellular telephone, a Personal Digital Assistant (PDA), a tablet device, a notebook device, a smart phone, and/or the like. Although FIG. 1 only shows a single user device 101 connected to the network, any number of user devices 101 may be connected to the network 110.

The user device 101 comprises an authentication module 102 and a transaction blockchain(s) 103. The authentication module 102 can be or may include any software/hardware that can be used to authenticate a user 104. For example, the authentication module 102 may ask the user 104 to provide a username/password, provide fingerprint information, provide voiceprint information, provide a retinal scan, provide a facial scan, give answers to captchas, give answers to specific questions, and/or the like. In addition, the authentication module 102 may track dynamic transactions that occur on the user device 101 and store the dynamic transactions in a record and/or the transaction blockchain 103. A dynamic transaction can be any transaction that is related to the user 104, such as, a login, a log out, establishing a communication (e.g., a voice call, a chat, video conference, and/or sending an email), launching an application that resides on the server 120, executing a command/script, saving a file, modifying a file, taking a picture or video, and/or the like.

The transaction blockchain(s) 103 can be or may include any type of blockchain that can store dynamic transactions of the user 104. The transaction blockchain 103 may comprise multiple transaction blockchains 103. For example, there may be an individual transaction blockchain 103 for each user 104 of the user device 101.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), Session Initiation Protocol (SIP), and/or the like. Thus, the network 110 is an electronic communication network configured to carry messages via packets and/or circuit switched communications.

The server 120 can be or may include any software/hardware that can provide computer resources 124 to the user 104, such as, a web server, an application server, a database server, a security server, a distributed database, a firewall, a personal computer, an embedded device, a sensor, a router, a proxy server, and/or the like. The server 120 may comprise one or more servers 120 and/or devices. The server 120 further comprises an authentication module 122, transaction blockchain(s) 123, and one or more computer resources 124.

The authentication module 122 works in conjunction with the authentication module 102 to authenticate the user 104. The authentication module 122 is used to verify various types of authentication credentials, such as, a username/password, fingerprint scans, voiceprints, rental scans, facial recognition, captchas, and/or the like. The authentication module 122 also verifies hashes of the transaction blockchain(s) 103 by comparing a hash of the transaction blockchain(s) 103 to a hash of the transaction blockchain(s) 123.

A computer resource 124 may comprise any device/system associated with or accessible from a computer (e.g., user device 101), such as, a server 120, a database (e.g., hard disks), a distributed database, a computer memory, a thumb drive, a CD/Blu-ray player, a dongle, a printer, a scanner, a FAX machine, a personal computer, a cellular device, a smartphone, a laptop computer, a tablet device, a security system, a computer program, an operating system, a virtual machine, a container, a computer network, and/or the like. Although the computer resource(s) 124 are shown on the server 120, the computer resource(s) 124 may reside anywhere on the network 110, on another network, and/or on the server 120.

Figure 2:
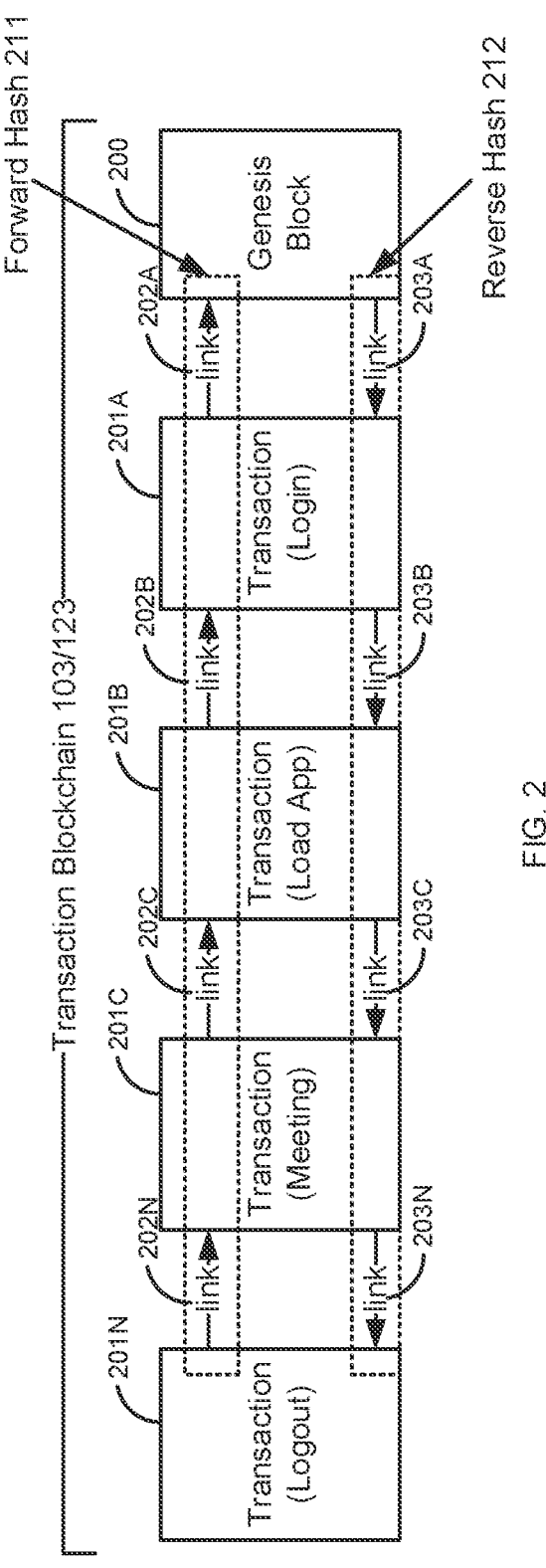
FIG. 2 is a block diagram of a transaction blockchain that comprises multiple transaction blocks.

FIG. 2 is a block diagram of a transaction blockchain 103/123 that comprises multiple transaction blocks 201A-201N and a genesis block 200. The genesis block 200 is created when the blockchain 103/123 is initially created. The transaction blocks 201A-201A are blocks that are added to the transaction blockchain 103/123 based on dynamic transactions associated with the user 104. The transaction blocks 201A-201N are linked together via forward links 202A-202N as is done in traditional blockchain. The forward links 202A-202N are used to compute a forward hash 211 (which is a known blockchain process). In addition, or alternatively, the blockchain 103/123 may be linked together via reverse links 203A-203N. The reverse links 203A-203N are used to compute a reverse hash 212. When referring to the term "hash", this may refer to a forward hash 211 and/or a reverse hash 212.

In one embodiment, the transaction blockchain 103/123 may contain different dynamic transactions that the user 104/user device 101 has had during a communication session(s) between the user device 101 and the server 120. For example, as shown in FIG. 2, the transaction blockchain 103/123 has four dynamic transactions that have been recorded in the transaction blocks 201A-201N: 1) login, 2) load app (e.g., the user 104 caused a computer program (a computer resource 124) on the server 120 to be executed), 3), joined meeting (e.g., a video conference), and 4) logout. The process of recording dynamic transactions in the transaction block 201 may be repeated each time the user 104 logs into the server 120.

Both the user device 101 and the server 120 create the transaction blockchains 103/123. In one embodiment, the server 120 creates the transaction blockchain 123 independently of the blockchain 103. Independent means that the user device 101 and the server 120 do not send messages to each other to create the transaction blocks 201A-201N. Instead, the user device 101 and the server 120 independently identify the dynamic transactions and independently add the respective transaction blocks 201A-201N to the respective blockchains 103/123. This is different from traditional blockchain algorithms where a request to add a new block to a blockchain is presented to all members of a distributed ledger.

Alternatively, the user device 101 and/or the server 120 may communicate to the other device to add a transaction block 201 to the respective blockchain 103/123. For example, the server 120 may identify a dynamic transaction and send a message to the user device 101 to add a transaction block 201 for the dynamic transaction. The user device 101 provisionally adds the transition block 201 to the transaction blockchain 103 and acknowledges the message. Once the server 120 receives the acknowledgment of the message, the server 120 adds the transaction block 201 to the transaction blockchain 123. The server 120 then sends a second acknowledgement to the user device 101. If the user device 101 does not receive the second acknowledgement message, the user device 101 removes the last transaction block 201. If the user device 101 receives the second acknowledgement message, the user device 101 moves the status form provisional to permanent for the transaction block 201. To ensure that the messages are received, a connection based protocol, such as, Transport Control Protocol (TCP) may be used.

The forward hash 211 and/or the reverse hash 212 are used to generate a unique signature of dynamic transactions of the user 104. The forward hash 211 and/or the reverse hash 212 are then used as an authentication credential that is provided by the authentication module 102 to the authentication module 122 for authenticating the user 104/user device 101. The forward hash 211/reverse hash 212 may use the same or different hashing algorithms. If both hashes are used, the forward hash 211 may be used as a key to a HMAC function where the reverse hash 212 is used as the input to produce the final hash (or the reverse) or any process to generate a hash that both the user device 101 and the server 120 can generate based on the forward hash 211/reverse hash 212.

The authentication process of providing the hash 211 and/or 212 may be used as a standalone authentication process or may be used in conjunction with another authentication process, such as a username/password, one or more biometrics, a captcha, and/or the like. In the exemplary transaction blockchain 103/123 of FIG. 2, the user 104 has only had a single communication session. Each time the user 104 logs in/logs out of the server 120, new transaction blocks 201 are added to the respective transaction blockchains 103/123 based on the dynamic transactions of the user 104. If the user 104/user device 101 is logging in for the first time, a hash of the genesis block 200 may be used (or some other secure mechanism). The hash of the genesis block 200 may have information specific to the user 104 and/or time the genesis block 200 was created. The genesis block 200 may be created as part of a corporate imaging process on the user device 101, which is used as the initial login credential (e.g., a hash of the genesis block 200). In this case, the hash of the genesis block 200 is provided in the initial login. Alternatively, when the user 104 first logs in using a new user device 101, the user 104 may be sent a verification code (e.g., to a cell phone). The user 104 then uses the verification code to login the first time instead of using a hash. This causes both the user device 101 and the server 120 to create their genesis block 200 and then start adding transaction blocks 201 based on dynamic transactions the next time the user 104 logs in.

The dynamic transactions that are stored in the transaction blockchain 103/123 may vary based on implementation. For example, the transaction blockchain 103/123 may only contain login and logout transactions (dynamic transactions that both the user device 101 and the server 120 are aware of). The transaction blocks 201 contain information specific to the user 104/communication session. For example, after logging into a web server 120, the user 104 opened web page X, selected button x on web page Y, etc. The dynamic transaction may be based on an image/video. For example, the user 104 may take a picture that is uploaded to a picture cloud service. This makes the hashes of the transaction blockchain 103/123 unique to each user 104 for each communication session/transaction blockchain 103/123. The transaction blocks 201 may use time information if the user device 101/server 120 use a common time (could be a time range (e.g., 12:35-12:36 AM) to avoid time sync issues). Some dynamic transactions may not be tracked. For example, login failures with invalid hashes (or all login failures) may not be tracked because this may cause the transaction blockchains 103/123 to not be synchronized because the attempt may be from an unauthorized user device 101.

The next time the user 104 logs in, a hash 211 and/or 212 is run over the transaction blockchain 103 by the user device 101. The user device 101 sends the hash 211 and/or 212 to the server 120 for verification as part of the authentication process. The server 120 compares the sent hash 211 and/or 212 to a hash of the transaction blockchain 123. If additional credentials are used (e.g., a username/password), the additional credentials are verified. If all the credentials are verified, the user 104/user device 101 are allowed to login. While the user 104 is logged in and then logs out new transaction blocks 201 are added to the transaction blockchains 103/123. The transaction blockchains 103/123 has one or more new transaction blocks 201 each time the user

104 logs in. Thus, the hash is unique each time the user 104/user device 101 logs in. Thus, the security of the server 120/computer resources 124 are dramatically enhanced.

Alternatively, the process could tie the user 104 to the blockchain/device and prevent access by another legitimate user 104 from the same user device 101. For example, when the genesis block 200 is created, the genesis block 200 may include the user's login username. This prevents another user 104 from using the same user device 101 because the username is tied to a device via the transaction blockchain 103. The username could be used as an index to identify the transaction blockchain(s) 103/123/user device(s) 101 that are associated with the user 104. If another user 104 tries to login from the same user device 101, the username won't match the username in the genesis block and thus the user's access will be denied access by the authentication module 122. In other words, a single user 104 (or specific users 104) can be associated with a single user device 101.

Figure 3:
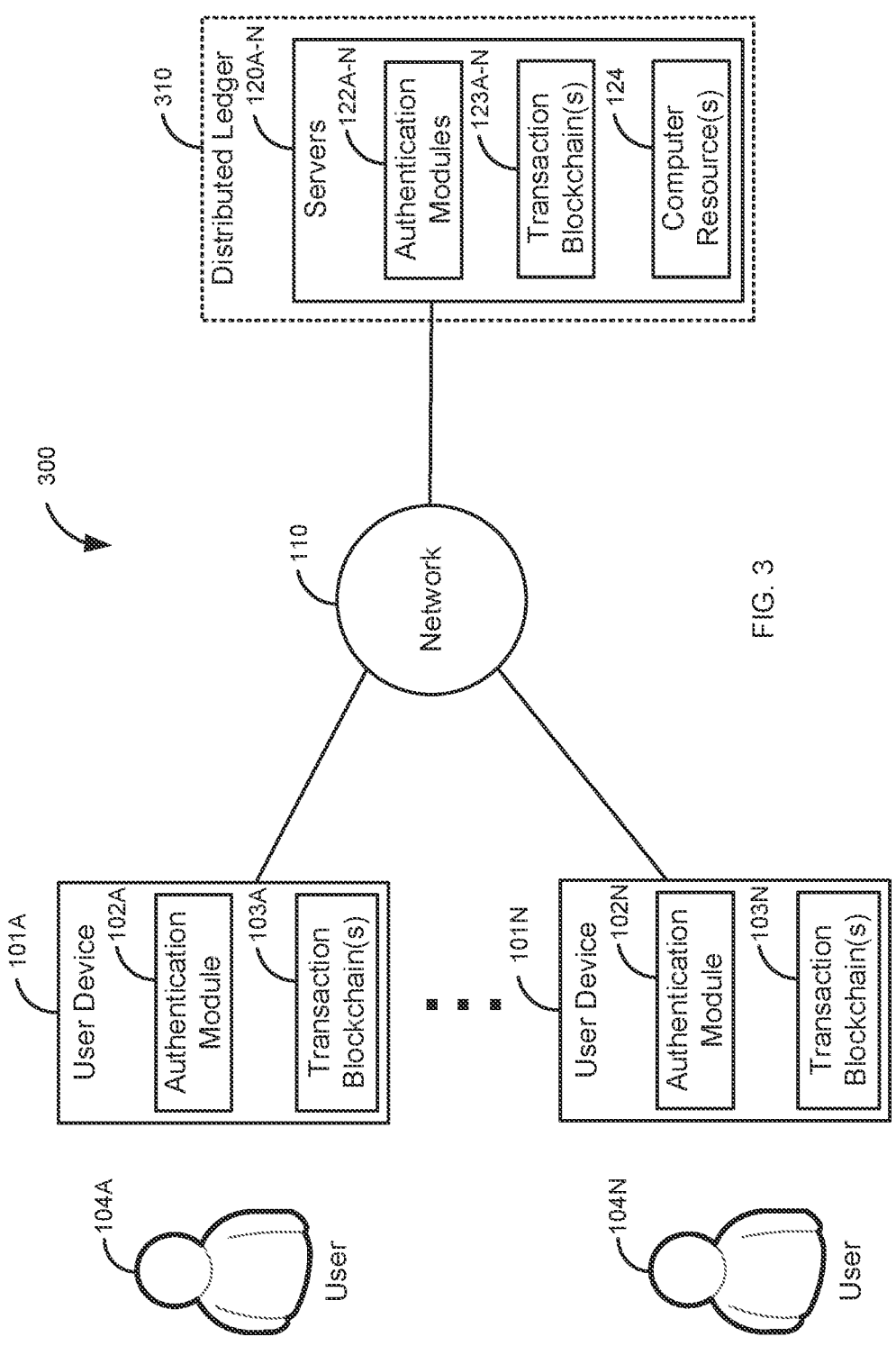
FIG. 3 is a block diagram of a second illustrative system for authenticating a user based on dynamic user transactions stored in a distributed ledger.

FIG. 3 is a block diagram of a second illustrative system 300 for authenticating a user 104 based on dynamic transactions stored in a distributed ledger 310. The second illustrative system 300 comprises user devices 101A-101N, the network 110, and servers 120A-120N. In FIG. 3, the users 104A-104N, via the user devices 101A-101N, can authenticate based on the distributed ledger 310. The distributed ledger 310 works like traditional blockchains where there are separate copies of the transaction blockchains 123A-123N that are stored on the servers 120A-120N in the distributed ledger 310. Each time a transaction block 201 is added to the transaction blockchains 123A-123N, the authentication modules 122A-122N vote to add the transaction block 201 to the transaction blockchains 123A-123N in the distributed ledger 310. Based on a consensus, the transaction block 201 is added to each of the transaction blockchains 123A-123N stored in the distributed ledger 310. In FIG. 3, there may be a single authentication module 122 that may track the dynamic transactions associated with each user device 101A-101N. The single authentication module 122 may then propose the addition of the transaction block 201 to the other authentication modules 122 in the distributed ledger 310.

In FIG. 3, there are individual transaction blockchains 103A-103N stored on each user device 101A-101N that are used to authenticate each user 104/user device 101A-101N that access the computer resource(s) 124. If the user 104 has multiple user devices 101A-101N or if there are multiple users 104A-104N on different user devices 101A-101N, there are separate blockchains that are generated and used to authenticate each user device 101A-101N/user 104A-104N. When the hash 211 and/or 212 is sent, the authentication modules 122A-122N compare the received hash 211 and/or 212 to the hashes of transaction blockchains 123A-123N that are associated with the respective user 104/user device 101 stored in the distributed ledger 310.

Figure 4A:
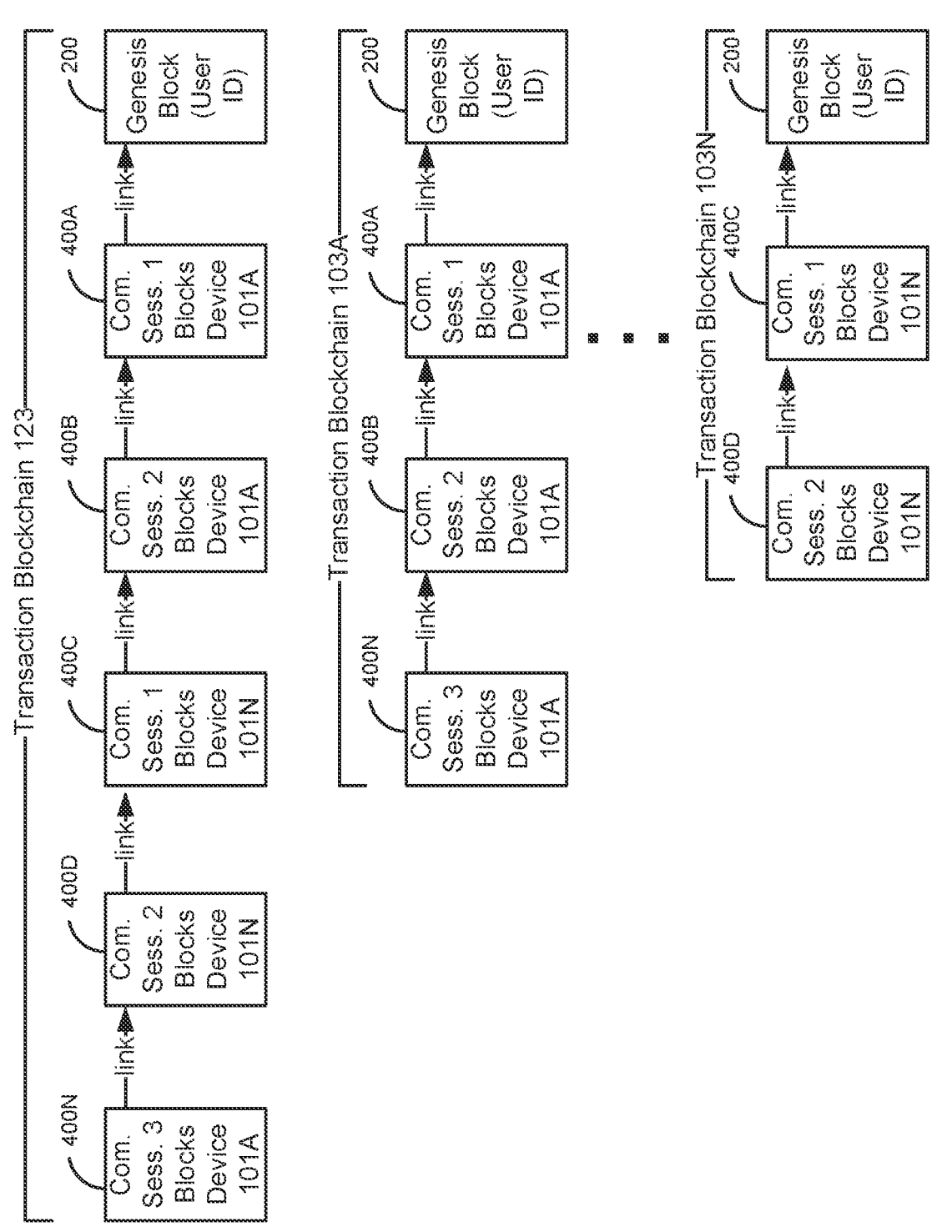
FIG. 4A is a block diagram of a transaction blockchain that supports the same user authenticating from a plurality of user devices.

FIG. 4A is a block diagram of a transaction blockchain 123 that supports the same user 104 authenticating from a plurality of user devices 101A-101N. The process of FIG. 4A will work with any of the systems/methods (e.g., 100, 300, and 500) described herein. FIG. 4A comprises the transaction blockchain 123 (on the server 120), the transaction blockchain 103A (on the user device 101A), and the transaction blockchain 103N (on the user device 101N).

In FIG. 4A, each of the blocks 400A-400N represent a number of transaction blocks 201 that were added to the transaction blockchains 103A-103N/123 during a communication session with the user 104. For example, the block 400A may comprise the transaction blocks 201A-201N as shown in FIG. 2. Each of the blocks 400A-400N represent dynamic transaction(s) that occurred during an individual communication session (e.g., a login session). The blocks 400A, 400B, and 400N represent individual communication sessions with the user 104A on the user device 101A. The blocks 400C-400D represent individual communication sessions with user 104A on communication device 101N. The blocks 400A, 400B, and 400N in the transaction blockchain 103A are created based on dynamic transactions (e.g., the user 104A logging in and logging out from user device 101A) on the user device 101A. Likewise, the blocks 400C-400D in the transaction blockchain 103N are created based on dynamic transactions (e.g., the user 104A logging in and logging out from user device 101N) during a communication session.

One difference is that each of the transaction blocks 201 in the blocks 400A-400N in the transaction blockchain 123 also identifies the specific user device 101. This is so the authentication module 122 can determine which transaction blocks 201 in the blocks 400A-400N are associated with a specific user device 101. Thus, the blockchain 123 comprises transaction blocks 201 from multiple user devices 101A-101N and the transaction blockchains 103A-103N only comprise transaction blocks 201 from an individual user device 101. The transaction blockchain 123 can track dynamic transactions where the user 104 is logged on with more than one device user device 101 (concurrent logins) and/or deny concurrent logins. If concurrent logins are allowed, transaction blocks 201 may be interspersed (i.e., not segregated based on a communication session) throughout the transaction blockchain 123.

Each device (the server 120/user device 101) tracks the dynamic transactions like described above with the exception that the device ID is included in the transactions block(s) 201. The server 120 verifies the hash of each individual user device 101 by only hashing the transaction blocks 201 in the transaction blockchain 123 associated with the individual user device 101 (both may include the genesis block 200) instead of running the full hash of the transaction blockchain 123. For example, to generate the hash for the user device 101A, the authentication module 122 generates the hash based on the transaction blocks 201 in blocks 400A, 400B, and 400N. Likewise, to generate the hash for the user device 101N, the authentication module 122 generates the hash based on the transaction blocks 201 in blocks 400C and 400D. The advantage to this process is that there is a single transaction blockchain 123 on the server 120 used instead of separate device transaction blockchains 123 that are tied to a user 104/user device 101. In other words, the transaction blockchain 123 is tied to a specific user 104, regardless of which user device 101 is used to access the server 120.

Figure 4B:
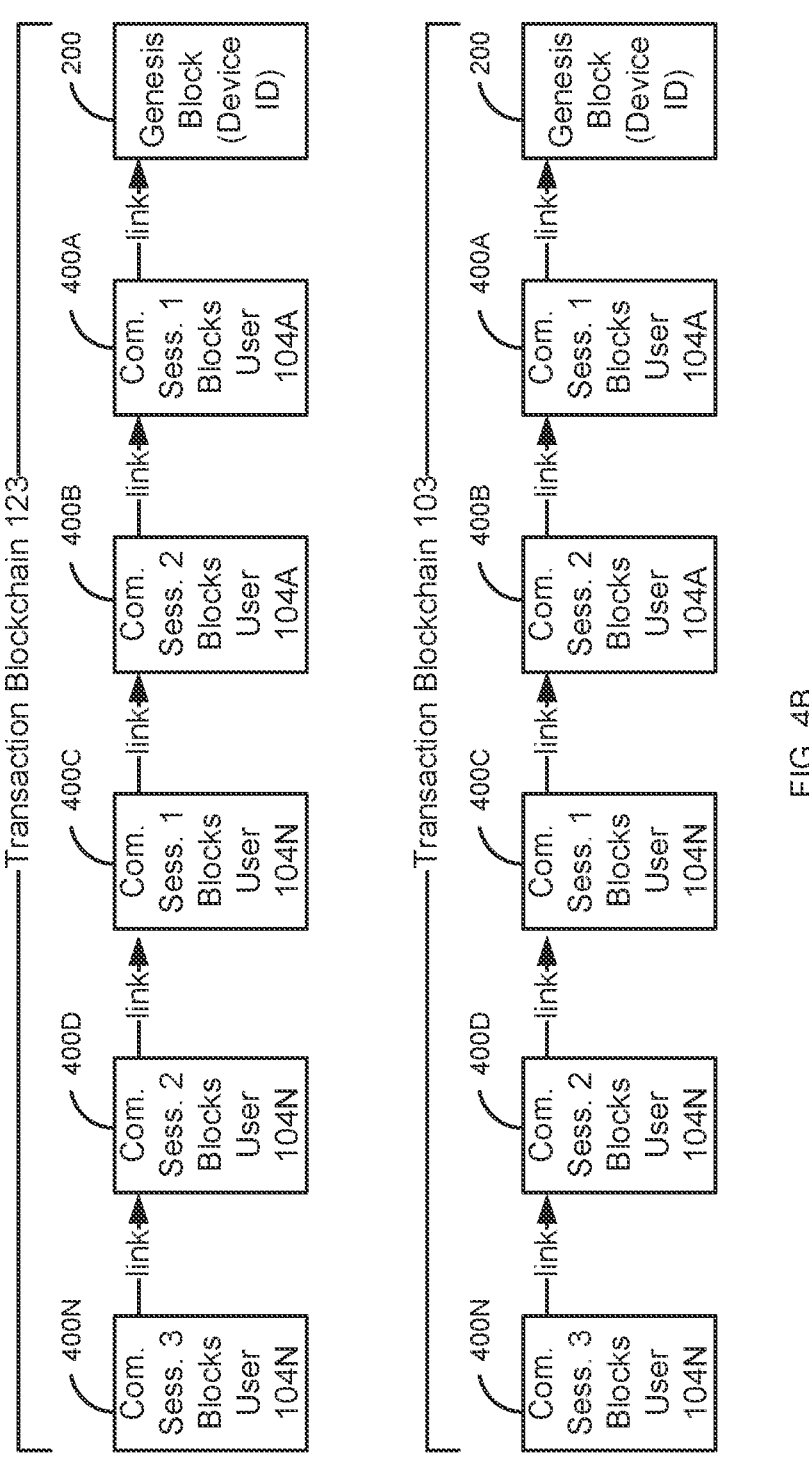
FIG. 4B is a block diagram of a transaction blockchain that supports multiple users authenticating from the same user device.

FIG. 4B is a block diagram of a transaction blockchain 123 that supports multiple users 104 authenticating from the same user device 101. As shown in FIG. 4B, the transaction blockchain 103 mirrors the transaction blockchain 123. The genesis blocks 200 includes a device identifier that identifies the user device (e.g., user device 101A). In this embodiment, the authentication modules 102/122 both generate a hash for transaction blocks 201 in the blocks 400A-400N from their respective transaction blockchain 103/123 that are associated with the user 104. When a user 104 logs in, the hash can be generated based on the full transaction blockchain 103 or based on the individual user 104. For example, if the user 104A wanted to authenticate, the authentication module 103 generates the hash based on the transaction blocks 201 in the blocks 400A, 400B, and 400N. Likewise, if the user 104N wanted to authenticate, the hash is generated based on the transaction blocks 201 in the blocks 400C-400D.

An alternative embodiment (not shown) is where the user device 101 and the server 120 may generate separate transaction blockchains 103/123 for each user 104 of the user device 101. For example, in FIG. 4B, there would be two transaction blockchains 103/123 on both the user device 101 and the server 120 for each user 104A/104N.

Figure 4C:
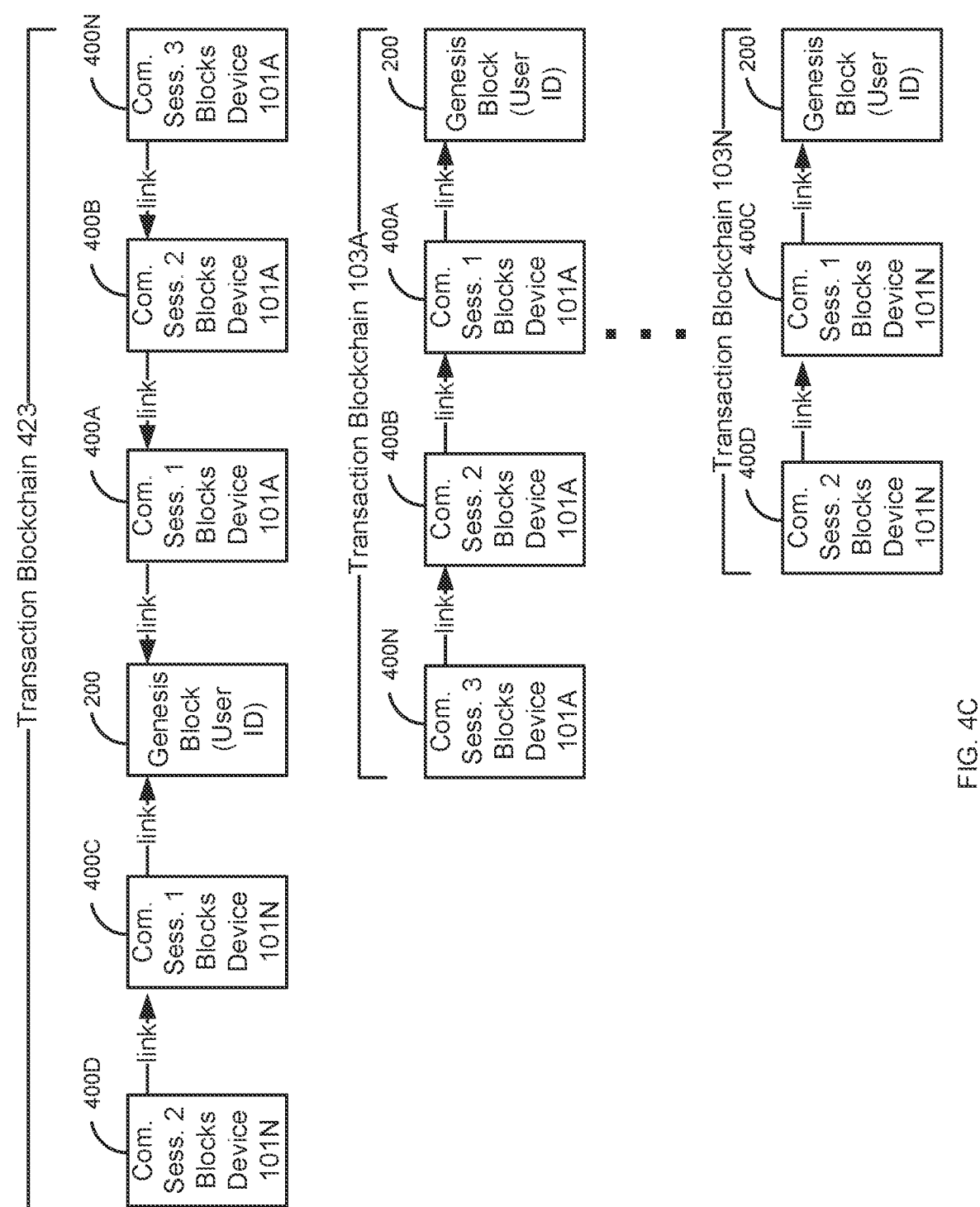
FIG. 4C is a block diagram of a star transaction blockchain that supports the same user authenticating from a plurality of user devices.

FIG. 4C is a block diagram of a star transaction blockchain 423 that supports the same user 104 authenticating from a plurality of user devices 101A-101N. The star transaction blockchain 423 comprises separate branches. The star transaction blockchain 423 has two branches (but may have more) were each branch is associated with an individual user device 101 that is used by the user 104. The first branch comprises blocks 400A, 400B, and 400N. The first branch links back to the genesis block 200 and is associated with the user device 101A. The second branch comprises blocks 400C and 400D. The second branch also links back to the genesis block 200 and is associated with the user device 101N. In this configuration, the blockchains 103A-103N are the same as is shown in FIG. 4A.

In this configuration, the genesis block 200 has the user ID. Each branch off the genesis block 200 has blocks 400A-400N is associated with an individual user device 101. This way, the system can do a hash of a branch for each user device 101 by starting at the last block and calculating the hash back to the genesis block 200. This configuration is more efficient (e.g., a more efficient database structure) because the amount of hashing is reduced on the server 120 because only the branch is hashed instead of the full blockchain (e.g., as shown in FIG. 4A).

Figure 5:
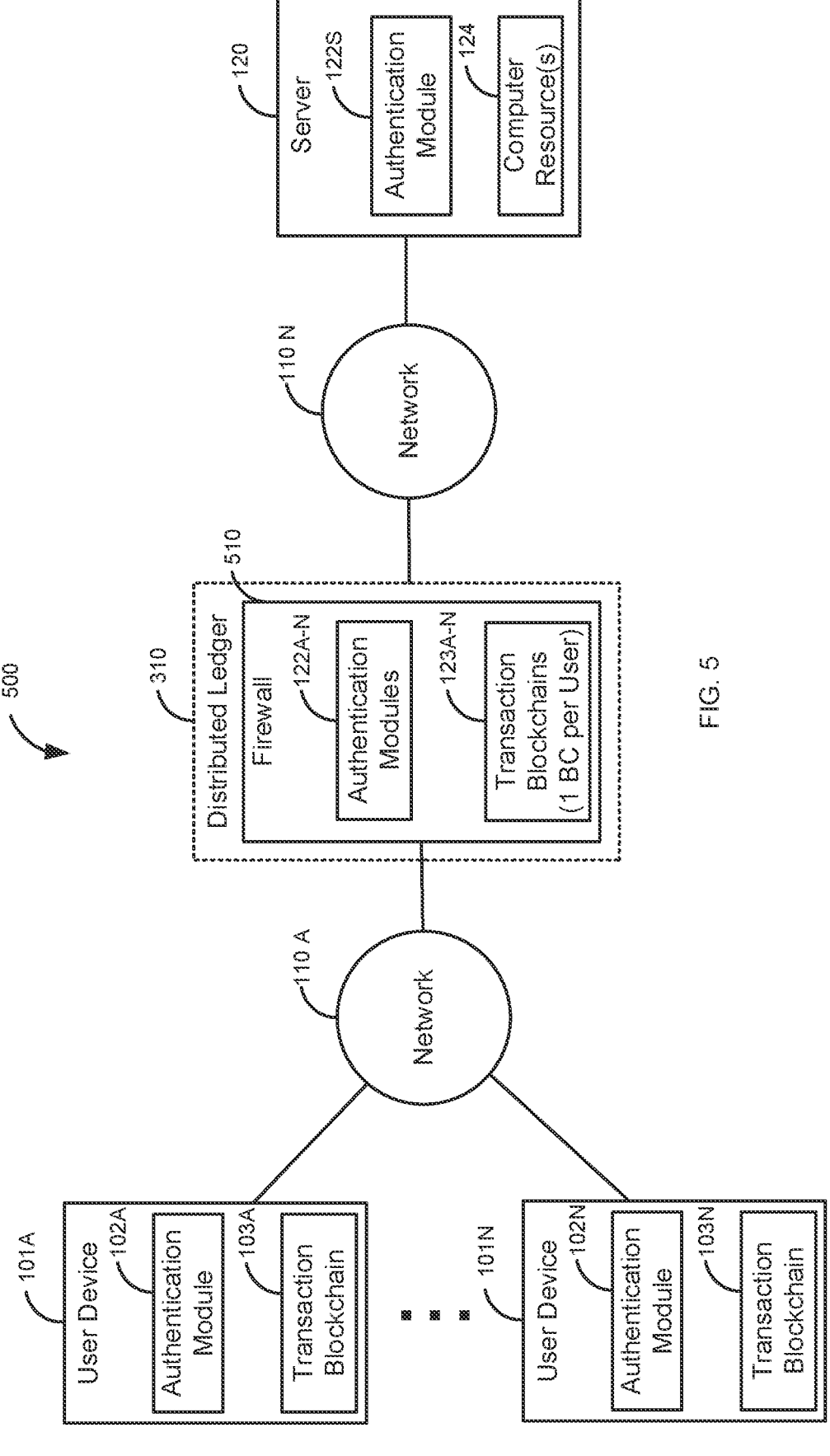
FIG. 5 is a block diagram of a third illustrative system for authenticating a user via a distributed authentication system.

FIG. 5 is a block diagram of a third illustrative system 500 for authenticating a user 104 via a distributed authentication system. The third illustrative system 500 comprises the user devices 101A-101N, networks 110A-110N, a firewall 510 (that is a part of the distributed ledger 310), and the server 120. In FIG. 5, the firewall 510 comprises the authentication modules 122A-122N and the transaction blockchain 123A-123N. Each of the transaction blockchains 123A-123N comprise the distributed ledger 310. The server 120 also comprises an authentication module 122S and the computer resource(s) 124.

In FIG. 5, the firewall 510 is used to identify valid user devices 101A-101N based on the blockchain hash 211/212. The username/password login and/or other authentication processes are accomplished separately on the server 120 by the authentication module 122S. In this model, the firewall 510 may be used to protect against a denial-of-service (DOS) attack. If the communication session is encrypted, the firewall 510 will have the encryption key to identify the dynamic transactions for creating the transaction blockchains 123.

In one embodiment of FIG. 5, there is not a distributed ledger 310 in the firewall 510. In this embodiment, the firewall 510 only has a single authentication module 122 (similar to FIG. 1). The transaction blockchain 123 is not replicated in the distributed ledger 310.

Figure 6:
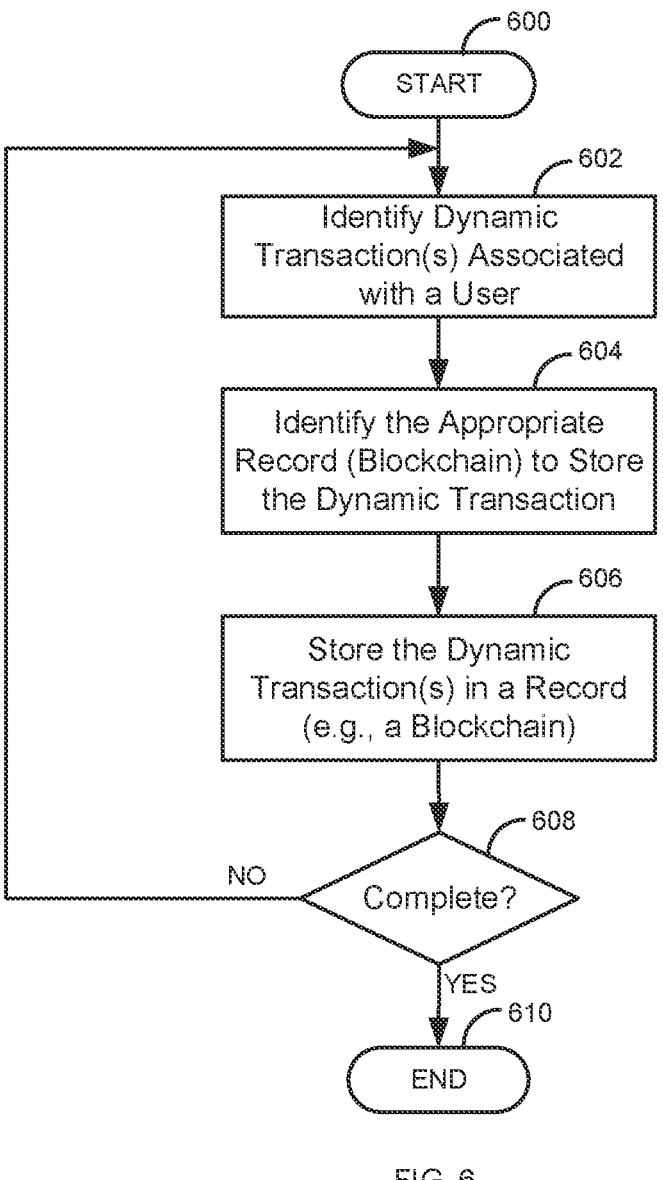
FIG. 6 is a flow diagram of a process for identify and storing dynamic transactions.

FIG. 6 is a flow diagram of a process for identify and storing dynamic transactions. Illustratively, the user devices 101A-101N, the authentication modules 102A-102N, the transaction blockchain(s) 103, the servers 120A-120N, authentication modules 122A-122N, the transaction blockchain(s) 123A-123N, the computer resource(s) 124, the distributed ledger 310, the firewall 510, and the authentication module 122S are stored-program-controlled entities, such as a computer or microprocessor, which performs the method of FIGS. 6-10 and the processes described herein by executing program instructions stored in a computer readable storage medium, such as a memory (i.e., a computer memory, a hard disk, and/or the like). Although the methods described in FIGS. 6-10 are shown in a specific order, one of skill in the art would recognize that the steps in FIGS. 6-10 may be implemented in different orders and/or be implemented in a multi-threaded environment. Moreover, various steps may be omitted or added based on implementation.

The process of FIG. 6 is used by both the authentication module 102 (and 102A-102N) and the authentication module 122 (and optionally 122A-122N). The process starts in step 600. The authentication module 102/122 identifies dynamic transaction(s) associated with the user 104 in step 602. The dynamic transaction(s) may be any dynamic transaction that can be associated with the user 104, such as, a login, a logout, executing an application, clicking on graphical object in the application, joining a communication session (e.g., a voice call), accessing a record in a database, deleting a file, modifying the file, executing a shell command, accessing a web site, taking a picture/video, and/or the like.

The authentication module 102/122 identifies the appropriate record to store the dynamic transaction in step 604. The appropriate record may be a specific block 201 in the transaction blockchain 103/123. For example, if the dynamic transaction is associated with a specific user 104, then the appropriate record may be a transaction block 201 in the transaction blockchain 103/123 (or a branch in the star transaction blockchain 423) associated with user 104. The authentication module 102/122 stores the dynamic transactions in the record in step 606 (e.g., the transaction blockchain 103/123).

The data stored in the records/transaction blockchain 103/123 can be made more secure (i.e., the hash is made less predictable). For example, size information, time information (a window), doing a HMAC of a shared secret each session, using a communication session identifier or session key, using a derivative password (similar to a smart card), and/or the like may be used to make the transaction data vary during each dynamic transaction. Thus, when a hash is run over the transaction data, it will be unique each time and extremely difficult to break using known techniques.

The process determines, in step 608, if the process is complete. If the process is not complete in step 608, the process goes to step 602. Otherwise, if the process is complete in step 606, the process ends in step 610.

Figure 7:
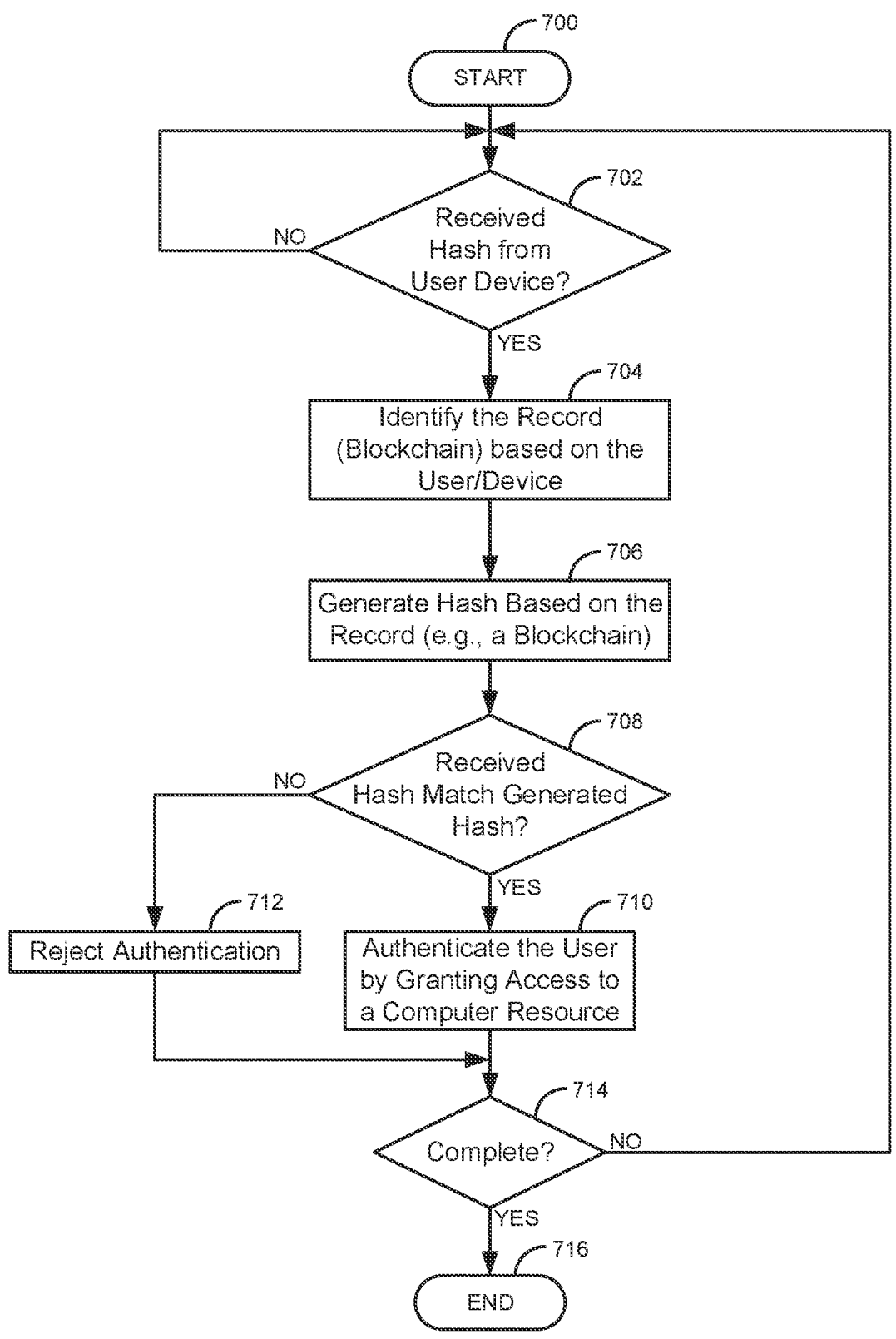
FIG. 7 is a flow diagram of a process for authenticating a user based on dynamic transactions.

FIG. 7 is a flow diagram of a process for authenticating a user 104 based on dynamic transactions. The process of FIG. 7 is from the perspective of the server 120 (in FIGS. 1 and 3) and the firewall 510 of FIG. 5.

The process starts in step 700. The authentication module 122 waits, in step 702, to receive a hash from the user device 101. For example, when the user 104 wants to login to the server 120, the authentication module 102 generates a hash of the transaction blockchain 103 and sends it to the server 120 as part of the authentication process. If a hash has not been received in step 702, the process of step 702 repeats.

Otherwise, if a hash has been received in step 702, the authentication module 122 identifies the appropriate record in step 704 (e.g., the transaction blockchain 123). For example, if the user 104 is named John Doe, the authentication module 122 identifies the transaction blockchain 123 associated with John Doe. The authentication module 122 generates a hash of the record in step 706 (e.g., the transaction blockchain 123).

In one embodiment, the hash may be over the dynamic transactions associated with the last communication session. For example, if there were dynamic transactions that occurred over the last twenty communication sessions stored in the transaction blockchain 103/123, the hash may only be run over the dynamic transactions for the last communication session or a threshold number of last communication sessions. Alternatively, the hash may be based on a last number of dynamic transactions.

The authentication module 122 determines, in step 708, if the received hash matches the generated hash. If the received hash does not match the generated hash in step 708, the authentication module 122 rejects the authentication in step 712. (e.g., the login request). Failures of the hash verification can also be tracked. A user account could be locked out if a threshold is met. In addition, an administrator could be notified of hash failures, login/hash failures (where one or both failed), etc.

Otherwise, if the received hash matches the generated hash in step 708, the authentication module 122 authenticates the user 104 by granting access to the computer resource 124. As discussed above, step 710 may use additional authentication metrics before granting access to the computer resource 124. For example, the authentication module 122 may also validate a username/password/digital certificate (or other authentication credentials) before allowing access to the computer resource 124 in step 710.

In one embodiment, instead of sending the password separately, the authentication module 102 on the user device 101 runs a hash of the password like it is an additional block 201/record (even though it is not stored in the transaction blockchain 103) in a similar manner as running a hash of a block 201. The process of hashing the password could start at the beginning or at the end of the blockchain hashes 211/212. The server 120 will also have the password/transaction blockchain 123 and can verify that the hash of the blockchain/password is valid. In this embodiment, there is only one login credential that changes every login (versus a changing hash and a username/password that are sent separately). The login credential is a combination of the transactions (which are dynamic/non-predictable) and the password. The username would have to be sent in the regular manner to identify the user 104.

This process could also be used where one or more authentication credentials are used. For example, the process could incorporate biometric(s) (may be limited to biometrics where the result is always the same), user questions, and/or the like. There can be a separate hash generated for each authentication credential that are like the hashes for blocks in the transaction blockchain 123 to produce the final hash that is sent to the server 120. This embodiment is basically a one-time password based on an actual password (semi-static) and dynamic transactions.

The process determines, in step 714, if the process is complete. If the process is not complete in step 714, the process goes back to step 702. Otherwise, if the process is complete in step 714, the process ends in step 716.

Figure 8:
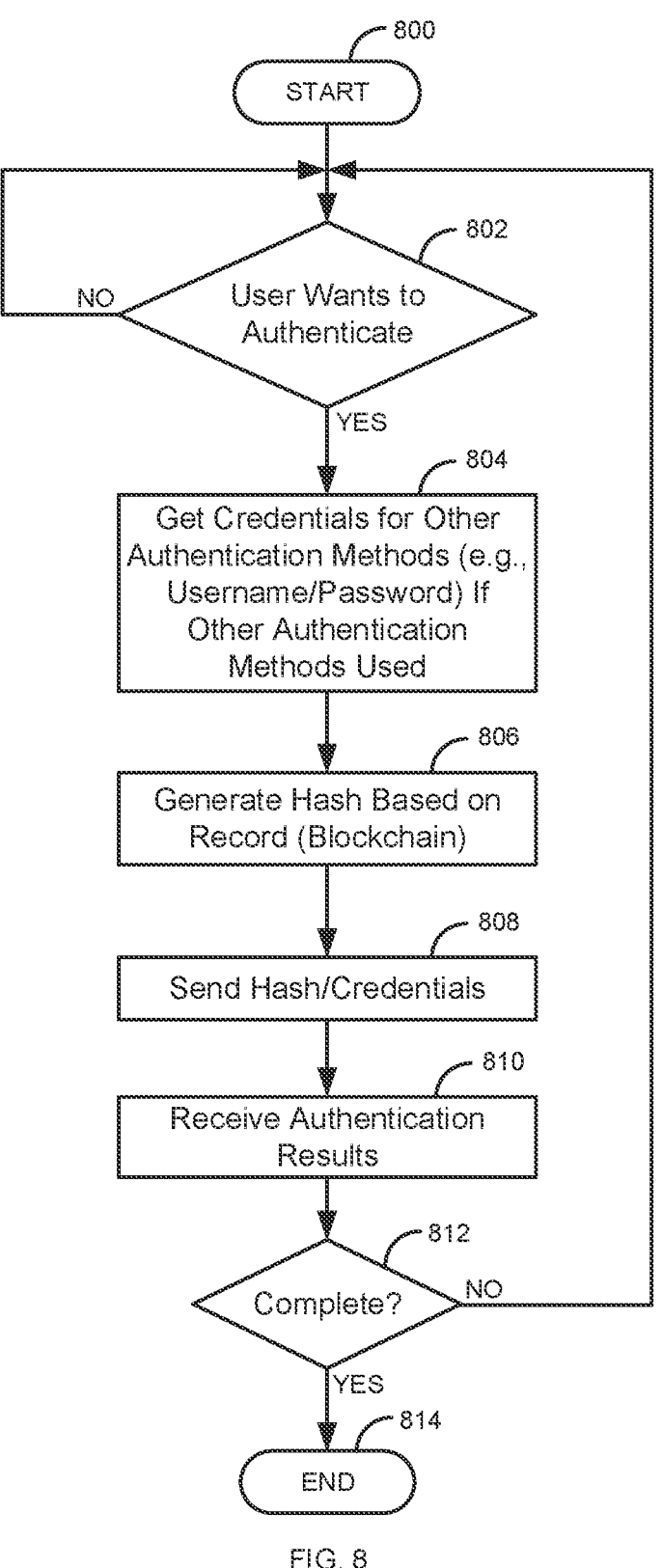
FIG. 8 is a flow diagram of a process for authenticating a user based on dynamic transactions.

FIG. 8 is a flow diagram of a process for authenticating a user 104 based on dynamic transactions. The process of FIG. 8 is from the perspective of the user device 101. The process of FIG. 8 works in conjunction with the process of FIG. 7.

The process starts in step 800. The authentication module 102 determines, in step 802, if the user 104 wants to authenticate. If the user 104 does not want to authenticate in step 802, the process of step 802 repeats. Otherwise, if the user 104 wants to authenticate in step 802, the authentication module 102 gets the authentication credentials for other authentication methods that are used (e.g., username/password, biometric, questions, etc.) in step 804. The authentication module 102 generates a hash based on the record in step 806 (e.g., a hash of the blockchain 211/212 and/or password). The authentication module 102 sends, in step 808, the hash/authentication credentials to the server 120 (or firewall 510). The authentication module 102 the receives the authentication results (e.g., pass/fail) in step 810.

The process determines, in step 812, if the process is complete. If the process is not complete in step 812, the process goes back to step 802. Otherwise, if the process is complete in step 812, the process ends in step 814.

Figure 9:
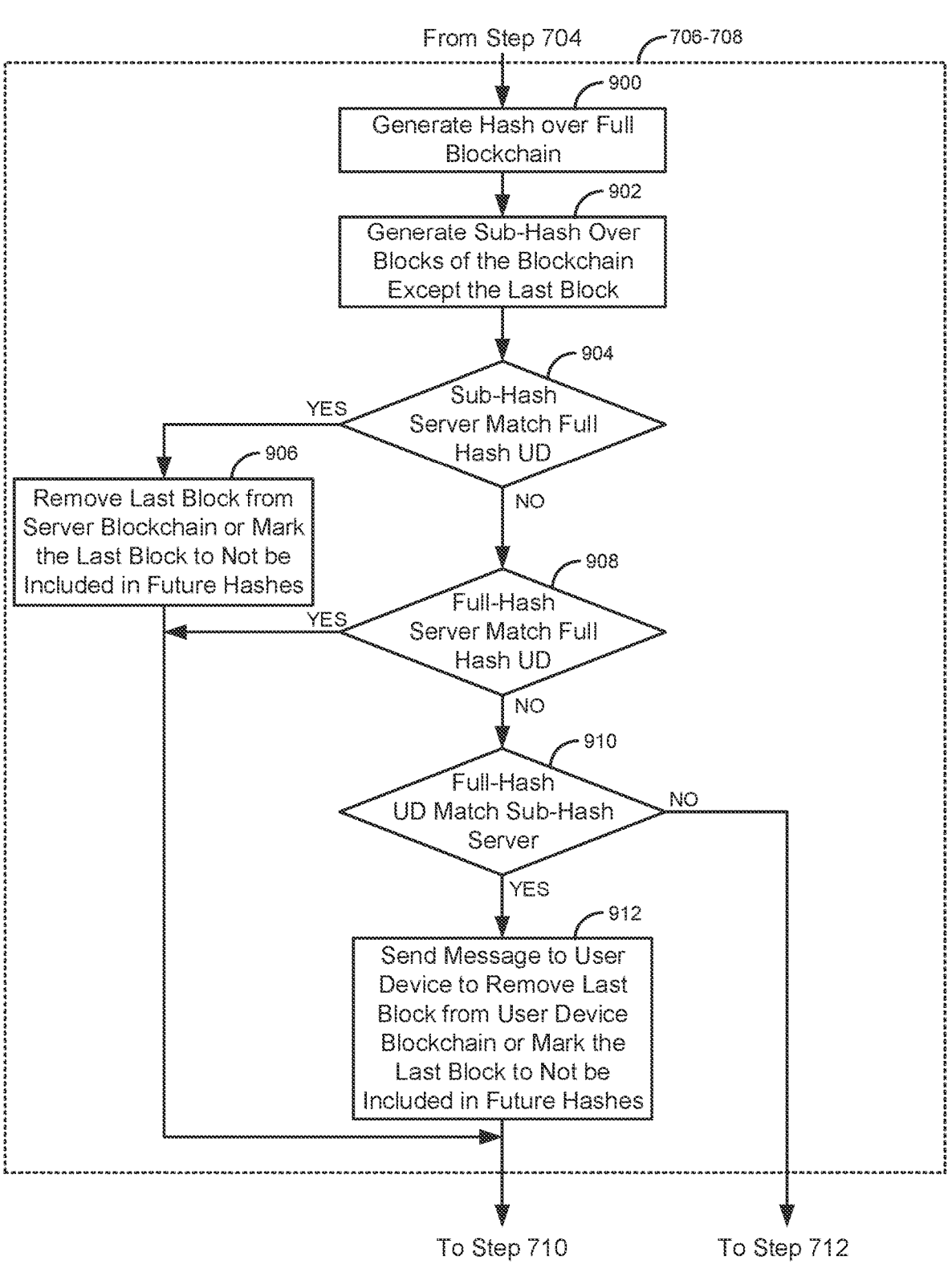
FIG. 9 is a flow diagram of a process for synchronization of a transaction blockchain that tracks dynamic transactions.

FIG. 9 is a flow diagram of a process for synchronization of a transaction blockchain 103/123 that tracks dynamic transactions. Because the dynamic transactions are detected and stored independently, the transaction blockchain 103/123 may become unsynchronized by one block 201 (assuming blocks are added based on time intervals or some other method). For example, if the user device 101 and/or server 120 loses power during a write of the transaction blockchain 103/123, one of the devices 101/120 may have recorded the last dynamic transaction in the transaction blockchain 103/123 while the other device 101/120 did not. In this situation, there are two scenarios that could occur: 1) where the server 120 has an extra block (e.g., block 201N), or 2) where the user device 101 has an extra block 201N. While the process of FIG. 9 is described using a transaction blockchain 103/123, one of skill in the art would recognize that the process of FIG. 9 may work based on a record (e.g., that are stored in a database or log file).

FIG. 9 is an exemplary embodiment of steps 706-708 of FIG. 7 (from the server 120 perspective). After identifying the correct transaction blockchain 123 in step 704, the authentication module 122 generates a hash over the full transaction blockchain 123 in step 900 (similar to step 706). The Authentication module 122 generates a sub-hash over transaction blocks 201 of the transaction blockchain 123 with the exception of the last block 201N in step 902. Although not shown in FIG. 9, the authentication module 102 does the same thing and generates a full hash and a sub-hash and sends both hashes as described in FIG. 10.

If the generated sub-hash of the transaction blockchain 123 matches the full hash of the transaction blockchain 103 (the transaction blockchain 123 has an extra transaction block 201N) in step 904, the authentication module 122 removes the last block 201N from the transaction blockchain 123 or marks the last block 201N to not be included in future hashes in step 906. The process then goes to step 710. Otherwise, if the sub-hash of the transaction blockchain 123 does not match the full hash of the transaction blockchain 103 in step 904, the authentication module 122 determines, in step 908, if the full hash of the transaction blockchain 123 matches the full hash of the transaction blockchain 103 (both transaction blockchains 103/123 are equal), the process goes to step 710.

Otherwise, if the full hash of the transaction blockchain 123 does match the full hash of the transaction blockchain 103 in step 908, the authentication module 122 determines, in step 910, if the full hash of the transaction blockchain 103 matches the sub-hash of the transaction blockchain 123 (the transaction blockchain 103 has an extra block 201N). If the full hash of the transaction blockchain 103 matches the sub-hash of the transaction blockchain 123 in step 91-0, the authentication module 122 sends, in step 912, a message to the user device 101 to remove the last block 201N from the transaction blockchain 103 or to mark the last block 201N to not be included in future hashes. The process then goes to step 710. Otherwise, if the full hash of the transaction blockchain 103 does not match the sub-hash of the transaction blockchain 123 in step 910 (no matches), the process goes to step 712 where the authentication is rejected.

Another way to deal with this problem is for the user device 101 to send the number of blocks in the transaction blockchain 103 to the server 120. If the number of blocks 201 in the transaction blockchain 123 are more than the number of blocks 201 on the transaction blockchain 103, the authentication module 122 removes the difference number of blocks 201 so that both of the transaction blockchains 103/123 are synchronized. If the number of blocks 201 in the transaction blockchain 123 are less than the number of transaction blocks 201 in the transaction blockchain 103, the authentication module 122 sends a message to the authentication module 102 to remove the difference number of blocks so that both of the transaction blockchains 103/123 are synchronized (or sends the server's 120 current number of transaction blocks 201). The authentication module 102 then removes the difference number of transaction blocks 201 from the transaction blockchain 123. This process may also mark transaction blocks 201 in a similar manner as described above so that the hash is not calculated for unsynchronized blocks.

Another way to deal with this problem is to only add dynamic transactions to the transaction blockchains 103/123 once a confirmed logout occurs on both sides where both sides can confirm the logout. This keeps the transaction blockchains 103/123 synchronized.

Figure 10:
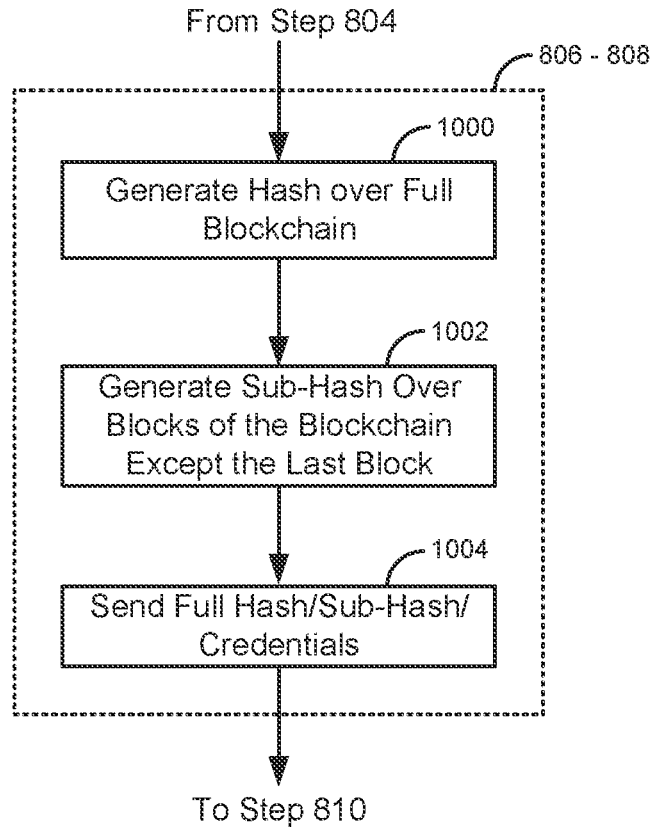
FIG. 10 is a flow diagram of a process for synchronization of a transaction blockchain that tracks dynamic user transactions.

FIG. 10 is a flow diagram of a process for synchronization of a transaction blockchain 103/123 that tracks dynamic transactions. FIG. 10 is an exemplary embodiment that works with FIG. 9. When the synchronization of the transaction blockchains 103/123 is needed as described in FIG. 9, steps 806-808 are modified as shown in FIG. 10. After getting the credentials for other authentication methods in step 804, the authentication module 102, in step 1000, generates a hash over the full transaction blockchain 103 like described in step 806 of FIG. 8. The authentication module 102 generates a sub-hash over the blocks of the transaction blockchain 103 with the exception of the last block 201N in step 1002. The authentication module 102, sends, in step 1004, both the full hash (from step 1000) and the sub-hash (from step 1002) along with the other credentials (e.g., the username/password). The process then goes to step 810 to wait for receipt of the authentication results.

The process may require that the user device 101 and the server 120 communicate when new transaction blocks 201 have been added so that the transaction blockchains 103/123 are synchronized. Alternatively, only login/logout transaction blocks 201 are added because these types of dynamic transaction are easier to confirm.

Another option would be to consolidate the transaction blockchains 103/123 after a number of dynamic transactions or logins. For example, after twenty logins, the previous dynamic transactions associated with the oldest nineteen logins would be removed from the transaction blockchain 103/123. Alternatively, new transaction blockchains 103/123 can be started that only contains the dynamic transactions that occurred during the last login/logout period. This keeps the size of the transaction blockchains 103/123 small. There could be a link back to the old transaction blockchain 103/123 in the genesis block 200 of the new transaction blockchain 103/123 so that a history of the transaction blockchains 103/123 can be tracked if needed. Both the user device 101 and the server 120 would use the same process.

In addition, the transaction blockchain 103 and/or 123 could be stored using an encryption process to prevent access from an unauthorized program/user 104.

Another option would be to not use a transaction blockchain 103/123, but just do a hash over a log file/information generated based on the dynamic transactions (as long as both the user device 101 and the server 120 can generate the same information). The hash can be run over data stored from the last session. The hash could be done over all the data (similar to what is with the transaction blockchain 103/123). One option would be to generate the hash and then delete the data and track the hashes.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:

identify a dynamic transaction associated with a first user,
wherein the dynamic transaction includes at least one of establishing a voice call, establishing a chat, establishing a video conference and sending an email;
store the dynamic transaction associated with the first user in a record;
receive a first hash from a first user device associated with the first user;
generate a second hash based on the record storing the dynamic transaction;
compare the first hash to the second hash; and
in response to the first hash matching the second hash, authenticate the first user by providing access to a computer resource,
wherein the record is a block in a second blockchain,
wherein the first hash is a hash of a first blockchain and the second hash is a hash of the second blockchain, and
wherein a genesis block in the first blockchain is created based on sending a verification code to a communication device of the first user and receiving a confirmation code from the first user from the communication device.

2. The system of claim 1, wherein the microprocessor readable and executable instructions further comprise: creating the second blockchain independently of the first blockchain.

3. The system of claim 1, wherein the second blockchain comprises one or more blocks created based on a first communication session with the first user from the first user device and one or more blocks created based on a second communication session with the first user from a second user device, and wherein the second hash is generated based on the one or more blocks crated based on the first communication session and not the one or more blocks created based on the second communication session.

4. The system of claim 1, wherein the second blockchain is in a distributed ledger and the first blockchain is not part of the distributed ledger.

5. The system of claim 1, wherein the first hash comprises two hashes including a full hash of the first blockchain and a sub-hash of the first blockchain, wherein the sub-hash of the first blockchain is not run over a last block of the first blockchain, and further comprising:
determine if the sub-hash of the first blockchain matches the second hash; and
in response to determining the sub-hash of the first blockchain matches the second hash doing one of:
remove a last block in the second blockchain; or
mark the last block in the second blockchain to not be included in generating a future hash of the second blockchain.

6. The system of claim 1, wherein the first hash comprises a number of blocks in the first blockchain and the microprocessor readable and executable instructions further cause the microprocessor to:
determine the number of blocks in the first blockchain does not match a number of blocks in the second blockchain; and
in response to determining that the number of blocks in the first blockchain does not match the number of blocks in the second blockchain, doing one of:
remove a number of blocks from the first blockchain or cause the number of blocks in the second blockchain to be removed so that the first blockchain and the second blockchain are a same size; or mark a number of blocks in the first blockchain or cause the number of blocks in the second blockchain to not be included in generating the first hash or the second hash at a future time.

7. The system of claim 1, wherein the first user device has a second user, wherein the first user device comprises a second blockchain that is used for tracking dynamic transactions associated with the second user.

8. The system of claim 1, wherein, based on information in the second blockchain, a second user cannot authenticate from the first user device.

9. The system of claim 1, wherein a plurality of users may authenticate from the first user device, wherein the second blockchain comprises a star transaction blockchain that comprises a branch for each user of the plurality of users.

10. The system of claim 1, wherein the first hash and the second hash are also generated using a user password.

11. The system of claim 1, wherein the first hash and the second hash are generated based on a number of user transactions or based on consolidation of the first blockchain and the second blockchain.

12. The system of claim 1, wherein authenticating the user by providing access to the computer resource uses a first authentication method and wherein the microprocessor readable and executable instructions further comprise:

use a second authentication method to further authenticate the first user, wherein the first authentication method is provided by a firewall and the second authentication method is provided separately from the firewall.

13. A method, comprising:

identifying, by a microprocessor, a dynamic transaction associated with a first user, wherein the dynamic transaction includes at least one of establishing a voice call, establishing a chat, establishing a video conference and sending an email;

storing, by the microprocessor, the dynamic transaction associated with the first user in a record;

receiving, by the microprocessor a first hash from a first user device associated with the first user;

generating, by the microprocessor, a second hash based on the record storing the dynamic transaction;

comparing, by the microprocessor, the first hash to the second hash; and in response to the first hash matching the second hash, authenticating, by the microprocessor, the first user by providing access to a computer resource, wherein the record is a block in a second blockchain, wherein the first hash is a hash of a first blockchain and the second hash is a hash of the second blockchain, and wherein a genesis block in the first blockchain is created based on sending a verification code to a communication device of the first user and receiving a confirmation code from the first user from the communication device.

14. The method of claim 13, wherein the second blockchain is created independently of the first blockchain.

15. The method of claim 13, wherein the first hash comprises two hashes including a full hash of the first blockchain and a sub-hash of the first blockchain, wherein the sub-hash of the first blockchain is not run over a last block of the first blockchain, and further comprising:

determining if the sub-hash of the first blockchain matches the second hash;

in response to determining the sub-hash of the first blockchain matches the second hash doing one of:

removing a last block in the second blockchain; or marking the last block in the second blockchain to not be included in generating a future hash of the second blockchain.

16. The method of claim 13, wherein the first user device has a second user, wherein the first user device comprises a second blockchain that is used for tracking dynamic transactions associated with the second user.

17. The method of claim 13, wherein a plurality of users may authenticate from the first user device, wherein the second blockchain comprises a star transaction blockchain that comprises a branch for each user of the plurality of users.

18. The method of claim 13, wherein authenticating the first user by providing access to the computer resource uses a first authentication method and further comprising:

using a second authentication method to further authenticate the first user, wherein the first authentication method is provided by a firewall and the second authentication method is provided separately from the firewall.

19. A non-transient computer readable medium having stored thereon instructions that cause a microprocessor to execute a method, the method comprising instructions to:

identify a dynamic transaction associated with a first user, wherein the dynamic transaction includes at least one of establishing a voice call, establishing a chat, establishing a video conference and sending an email;

store the dynamic transaction associated with the first user in a record;

receive a first hash from a first user device associated with the first user;

generate a second hash based on the record storing the dynamic transaction;

compare the first hash to the second hash; and in response to the first hash matching the second hash, authenticate the first user by providing access to a computer resource, wherein the record is a block in a second blockchain, wherein the first hash is a hash of a first blockchain and the second hash is a hash of the second blockchain, and wherein a genesis block in the first blockchain is created based on sending a verification code to a communication device of the first user and receiving a confirmation code from the first user from the communication device.

20. The method of claim 13, wherein the second blockchain is in a distributed ledger and the first blockchain is not part of the distributed ledger.

* * * * *